United States Patent
Lampinen et al.

(10) Patent No.: US 9,317,944 B2
(45) Date of Patent: Apr. 19, 2016

(54) ALIGNMENT OF START AND END OF DASHED CURVES

(71) Applicant: CANON KABUSHIKI KAISHA, Tokyo (JP)

(72) Inventors: Ari Pekka Lampinen, North Rocks (AU); Hervé Soulard, Beacon Hill (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 14/468,884

(22) Filed: Aug. 26, 2014

(65) Prior Publication Data

US 2015/0063706 A1    Mar. 5, 2015

(30) Foreign Application Priority Data

Aug. 28, 2013    (AU) .................................. 2013221944

(51) Int. Cl.
  *G06K 9/48*    (2006.01)
  *G06T 11/20*    (2006.01)
(52) U.S. Cl.
  CPC ..................................... *G06T 11/203* (2013.01)
(58) Field of Classification Search
  None
  See application file for complete search history.

(56) References Cited

U.S. PATENT DOCUMENTS

| 6,441,823 B1 * | 8/2002 | Ananya ................. G06T 11/203 345/442 |
| 8,659,786 B2 * | 2/2014 | Soulard ................. G06F 17/175 358/1.18 |
| 2011/0285722 A1 | 11/2011 | Kilgard et al. |
| 2011/0285723 A1 | 11/2011 | Kilgard |
| 2012/0268794 A1 | 10/2012 | Soulard |

FOREIGN PATENT DOCUMENTS

EP    0605048 B1    3/1999

* cited by examiner

*Primary Examiner* — Daniel Mariam
(74) *Attorney, Agent, or Firm* — Canon USA, Inc. IP Division

(57) ABSTRACT

Disclosed is a computer-implemented method of vectorizing a curve. The method determines a reference point distanced from the curve and a first point on the curve associated with the reference point, and a line running through the reference point from a tangent to the curve at the first point, where the line and tangent are parallel. A shift point is then determined on the determined line, and the curve is vectorized by a path formed from a plurality of linear segments, the plurality of segments comprising at least a segment joining the reference point and the shift point. From the vectorization of the curve the curve can be rendered, particularly using dashed strokes.

22 Claims, 13 Drawing Sheets

ALIGNMENT OF START AND END OF DASHED CURVES

REFERENCE TO RELATED APPLICATION(S)

This application claims the benefit under 35 U.S.C. §119 of the filing date of Australian Patent Application No. 2013221944, filed Aug. 28, 2013, hereby incorporated by reference in its entirety as if fully set forth herein.

TECHNICAL FIELD

The present invention relates to computer graphics rendering and, more particularly, to methods, systems and computer programs for vectorizing a dashed curve.

BACKGROUND

It is common for electronic documents to contain curved lines (e.g. vector graphics) which may then have a dash pattern applied to them. The lines may need to be stroked, meaning that the 'brush stroke' width of the line or the dash pattern is changed. Subject to the length of the dash pattern relative to the brush stroke, and the width such a brush stroke creates, the dash pattern may appear either in-line with or transverse the curved line. When these documents need to be rendered for reproduction by a reproduction device, such as for display or for printing by a computing system, it is often necessary to convert the curves into a series of connected vectors (straight lines) which is then labelled as a path. Since the curve is approximated by a series of straight lines, there exists a level of error between the approximated path and the original curve. Existing computing systems, particularly in Raster Image Processors (RIP), approximate the curve based on a parameter known as the 'flatness tolerance', which defines the maximum amount of error the approximated path can deviate away from the original curve. The flatness tolerance is generally chosen such that the errors between the original curve and the approximated path of lines are not noticeable to the end user. The approximated path of straight lines is typically subdivided into dash and gap sections according to a given dash pattern, and each dash end, or endcap, is typically stroked by taking the perpendicular of the approximated path.

However, this approach can cause noticeable errors in the final appearance of the curve. For example, two dash ends located very near to each other on the curve with flat style endcaps should generally have nearly parallel endcaps, but when those two ends are located on two different straight lines, the endcaps will be sloped according to the different angles of the straight lines, and may intersect or otherwise have an incorrect appearance. Alternatively, if those two dash ends happen to be located on the same straight line, their endcaps will incorrectly be exactly parallel.

These problems are generally magnified further when the stroke width is large relative to the dash or gap length.

A common approach to avoid these issues is to increase the number of straight lines in the approximated curve. While this approach lessens the problem, it is not eliminated. Further, this approach increases the complexity of the approximate path and the eventual stroked path, thereby increasing the computational overhead and thus slowing down the processing of the curve.

Another approach suitable for certain types of curves is to directly calculate, for each pixel in the neighbourhood of a stroked dash, whether the pixel lies inside or outside the ideal dash outline. However, in many systems, particularly print rendering systems, the hardware capabilities available are insufficient to apply this method with acceptable performance.

Thus there exists a need to overcome, or at least ameliorate, the disadvantage of existing dashed curve approximation algorithms used in computing systems, and in particular RIPs.

SUMMARY

According to a first aspect of the present disclosure there is provided a method of processing a curve intended to be dashed and stroked, the method comprising:

obtaining a first vectorization of the curve according to a predetermined flatness tolerance to establish at least one initial linear segment between corresponding vectorization points;

identifying an endpoint of a dash on one said initial linear segment as a reference point;

establishing a tangent to the curve at a first point on the curve associated with the reference point;

determining, in accordance with the pre-determined vectorization flatness tolerance, by the processor, a shift point on a line running through the reference point, said line being parallel to the tangent to the curve at the first point and the shift point being within the dash; and determining a dashed vectorization of the curve having at least one path, each said path being formed from a plurality of further linear segments, the further linear segments comprising at least a first further segment joining the reference point and the shift point, and a second further segment joining the shift point and a further point determined using at least a length of the dash.

In one implementation, the method further comprises moving a position of the endpoint to a modified position to maintain an endpoint of the dash on the curve. In another, the method further comprises moving a position of the shift point to a modified position located on the curve. Here, the method can move the reference point to a new position to ensure a distance between the new position and the modified position is less than the flatness tolerance to ensure all segments of the further vectorization are within the flatness tolerance.

In a preferred implementation, the first point is associated with the reference point by a line perpendicular to the tangent passing through the reference point. Desirably a location of the further point is dependent on the first vectorization. Preferably a vectorization point of the first vectorization is selected as the further point based on distance between the shift point and a vectorization point.

In an advantageous example, the method further comprises removing at least one intermediate vectorization point from the first vectorization. Preferably the removal of the at least one intermediate vectorization point is based on a curvature of the curve in the vicinity of the intermediate vectorization point. Alternatively the removal of the intermediate vectorization point is based on a position of at least one of the shift point and the reference point.

Desirably, wherein the position of the shift point along the line parallel to the tangent is determined in accordance with at least one of:

(i) the flatness tolerance;
(ii) the curvature of the curve; and
(iii) the position of the reference point relative to a closest intermediate vectorization point from the first vectorization.

Preferably the curvature is determined based on slope of the curve tangents in the vicinity of the shift point. Also, the curvature can be determined as that of an arc of the curve between the endpoint and the intermediate vectorization point. Desirably the curvature is based on circle fitted to the arc.

According to another aspect, there is disclosed a method of vectorizing a curve, the method being performed by a processor and comprising:

determining a reference point distanced from the curve and a first point on the curve associated with the reference point;

determining a line running through the reference point from a tangent to the curve at the first point, said line and tangent being parallel;

determining, by the processor, a shift point on the determined line; and vectorizing the curve by a path formed from a plurality of linear segments, the plurality of segments comprising at least a segment joining the reference point and the shift point.

In another aspect, provided is a method for rendering a curve, the curve having a control point, the method comprising:

receiving a set of intermediate points characterizing a vectorised curve corresponding to a vectorized representation of the curve with a pre-determined flatness tolerance;

receiving a reference point associated with the vectorized curve, the reference point being distanced from the curve, a position of the reference point being determined based on a pre-determined dash pattern;

determining a line running through the reference point being parallel to a tangent to the curve at a first point, wherein the first point being associated with the reference point;

determining a shift point on the determined line; and rendering the curve by using vectorised segments, wherein vectorised segments are formed by vectorizing the curve using the received set of intermediate points by a path formed from a plurality of linear segments, the plurality of segments comprising at least a segment joining the reference point and the shift point.

Preferably a position of the shift point is determined in accordance with the pre-determined flatness tolerance, the dash pattern, a relative position of at least one point from the received set of intermediate points and a curvature of the curve. Advantageously the plurality of segments comprises a segment joining the shift point and an intermediate point from the set of intermediate points. In a specific implementation the tangent to the part of the curve at the endpoint is determined based on control points of the curve and a position of the endpoint along the curve. In another example the rendering further comprises stroking the vectorized segments at a pre-determined stroke width.

Other aspects are also disclosed.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1A:
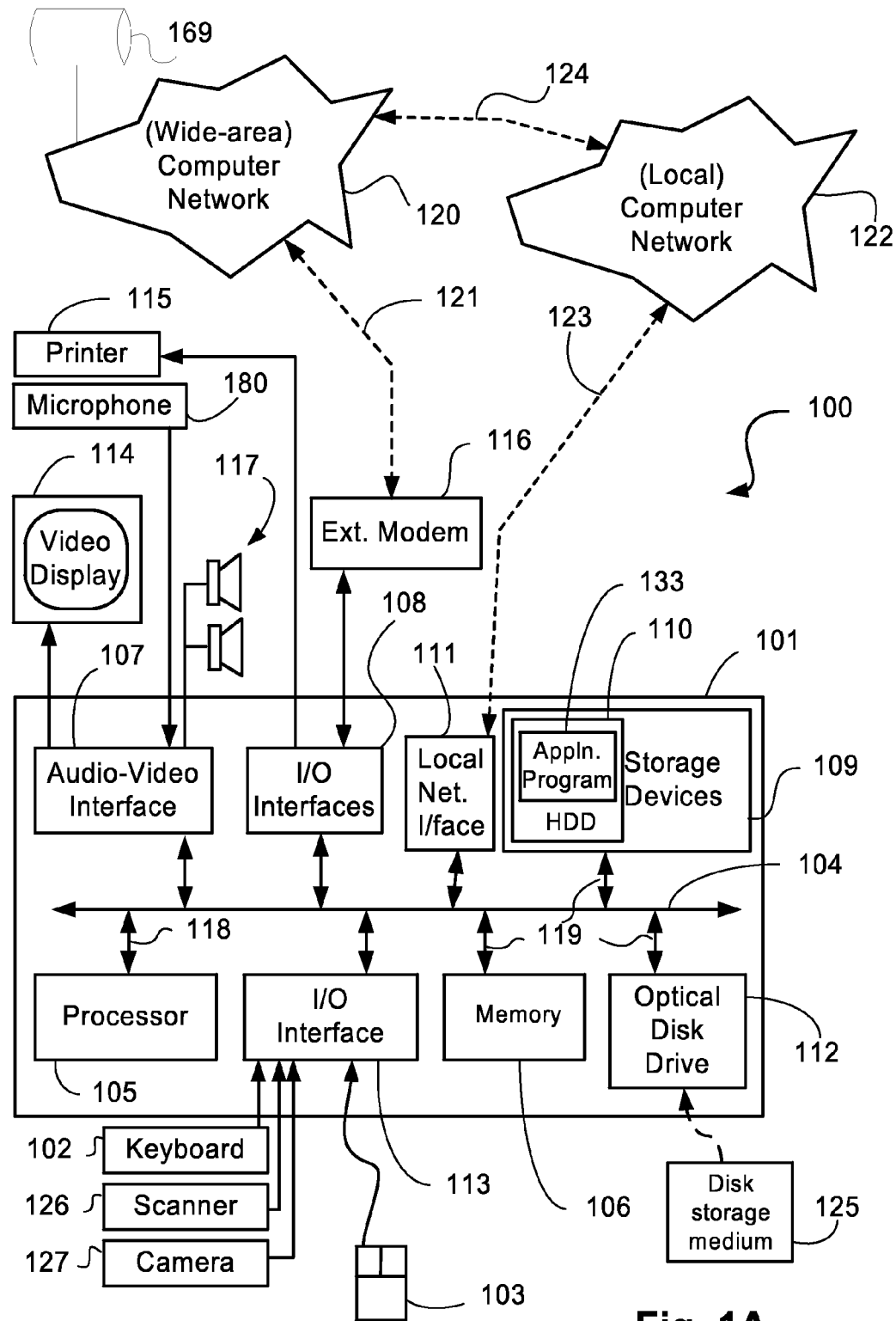
FIGS. 1A and 1B is a schematic block diagram of a data processing architecture in which the arrangements described can be performed.
Figure 1B:
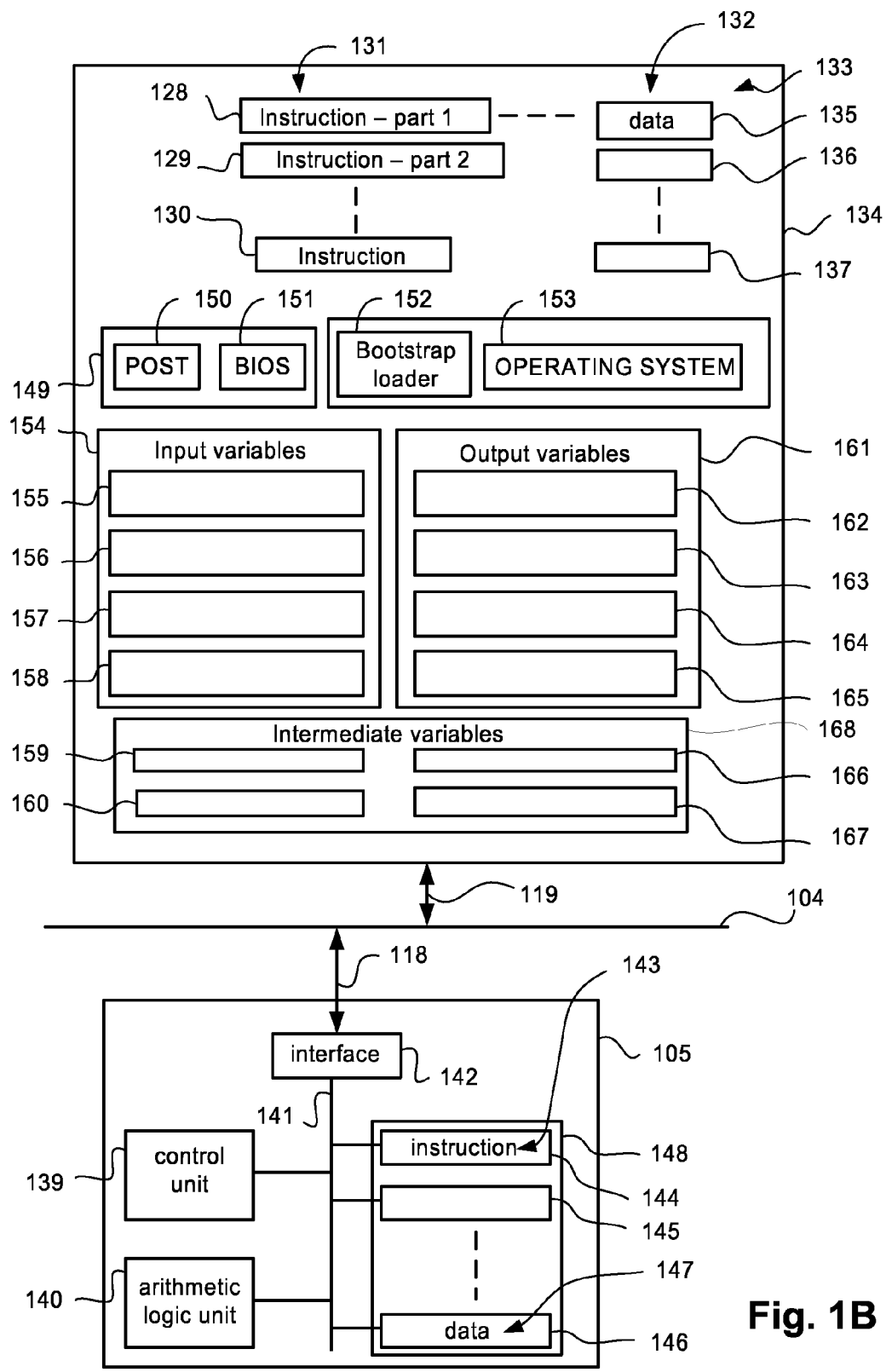

FIGS. 1A and 1B collectively form a schematic block diagram of a general purpose computer system apparatus 100, upon which the various curve vectorisation arrangements described may be practiced.

As seen in FIG. 1A, the computer system 100 is formed by a computer module 101, input devices such as a keyboard 102, a mouse pointer device 103, a scanner 126, a camera 127, and a microphone 180, and output devices including reproduction devices such as the printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g.: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes a number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other memory storage devices such as a floppy disk drive and a magnetic tape drive (not illustrated) may also be used. An optical disk drive 112 is typically provided to act as a non-volatile source of data. Portable memory devices, such optical disks (e.g.: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements may be practised include IBM-PC's and compatibles, Sun Sparcstations, Apple Mac™ or alike computer systems evolved therefrom.

Figure 6:
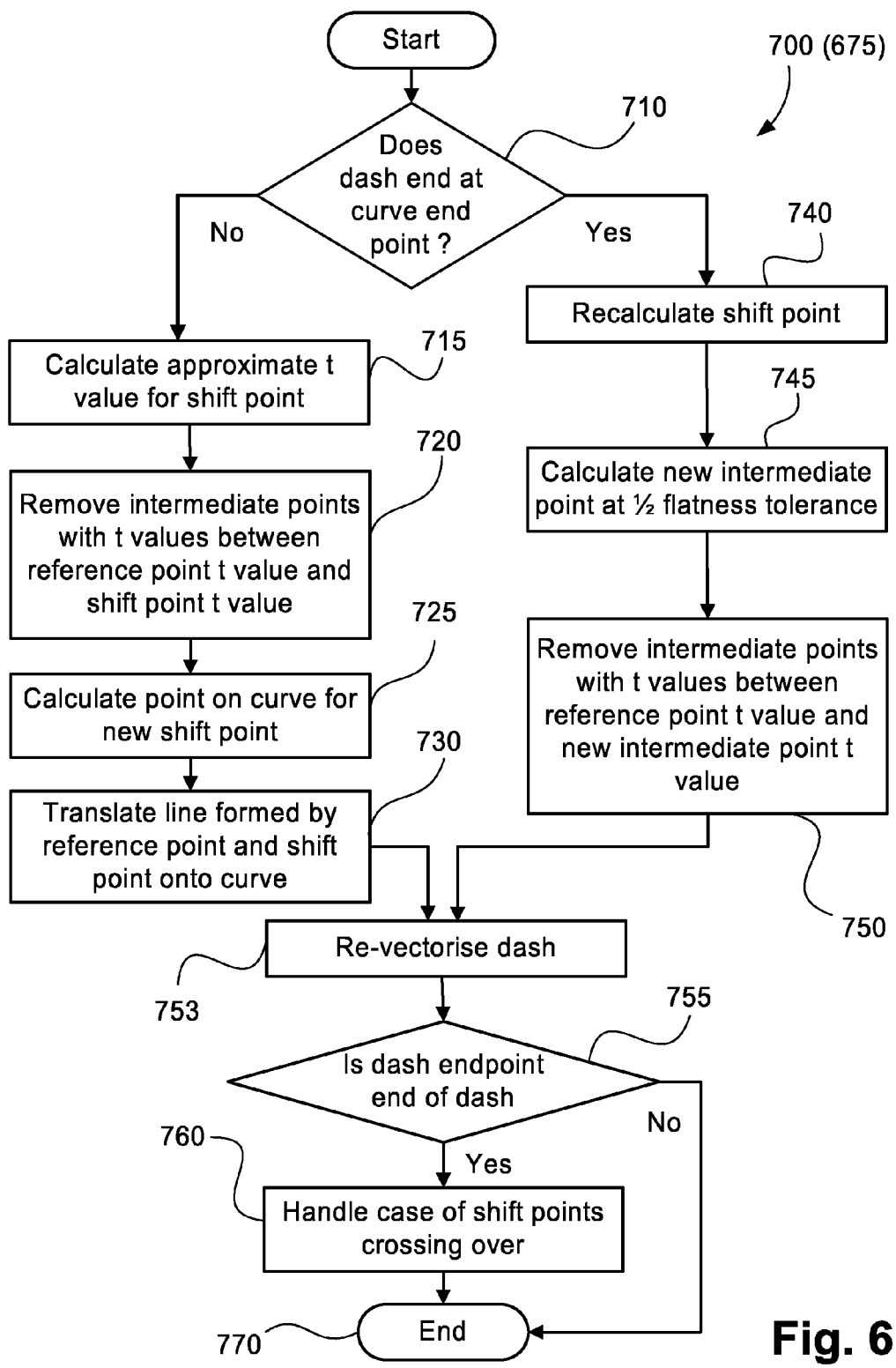
FIG. 6 is a schematic flow diagram of re-vectorizing a Bezier curve in accordance with a dash pattern.
Figure 11:
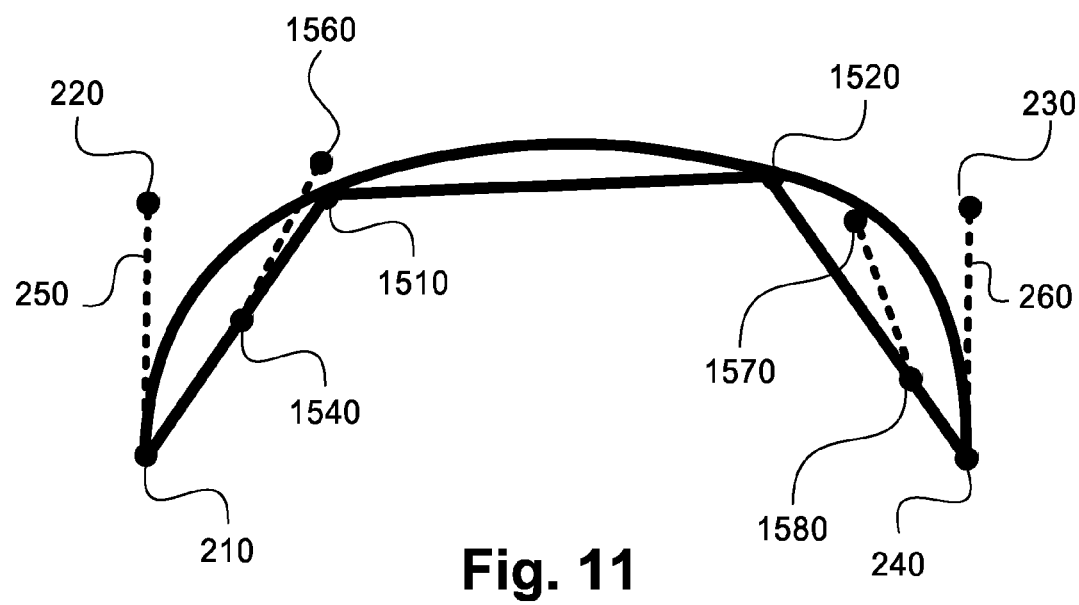
FIG. 11 is an alternative example of the interim steps used to generate a vectorised sub-curve generated by the sub-curve vectorisation arrangement of FIG. 5.

The curve vectorisation may be implemented using the computer system 100 wherein the processes of FIGS. 6 and 11, to be described, may be implemented as one or more software application programs 133 executable within the computer system 100. In particular, the steps of the curve vectorisation are effected by instructions 131 in the software 133 that are carried out within the computer system 100. The software instructions 131 may be formed as one or more code modules, each for performing one or more particular tasks. The software may also be divided into two separate parts, in which a first part and the corresponding code modules performs the curve vectorisation and a second part and the corresponding code modules manage a user interface between the first part and the user.

The software 133 is generally loaded into the computer system 100 from a computer readable medium, and is then typically stored in the HDD 110, as illustrated in FIG. 1A, or the memory 106, after which the software 133 can be executed by the computer system 100. In some instances, the printing application programs 133 may be supplied to the user encoded on one or more CD-ROM 125 and read via the corresponding drive 112 prior to storage in the memory 110 or 106. Alternatively the curve vectorisation software 133 may be read by the computer system 100 from the networks 120 or 122 or loaded into the computer system 100 from other computer readable media. Computer readable storage media refers to any tangible, non-transitory storage medium that participates in providing instructions and/or data to the computer system 100 for execution and/or processing. Examples of such storage media include memory devices such as floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of transitory computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the printing application programs 133 and the corresponding code modules mentioned above may be executed to implement one or more graphical user interfaces (GUIs) to be rendered or otherwise represented upon the display 114, for example. Through manipulation of typically the keyboard 102 and the mouse 103, a user of the computer system 100 and the curve vectorisation application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 should be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The printing application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein.

The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed curve vectorisation arrangements may use input variables 154 that are stored in the memory 134 in corresponding memory locations 155-158. Examples of input variables 154 that may be used in the disclosed curve vectorisation arrangements include:

(i) Control points;
(ii) Flatness tolerance; and
(iii) Dash pattern.

The curve vectorisation arrangements produce output variables 161 that are stored in the memory 134 in corresponding locations 162-165. Examples of output variables 161 that may be used in the disclosed curve vectorisation arrangements include:

(i) an output path array representing the outline of the stroked, dashed path.

Intermediate variables 168 may be stored in memory locations 159, 160, 166 and 167. Examples of intermediate variables 168 that may be used in the disclosed curve vectorisation arrangements include:

(i) Minimum sample step values;
(ii) Length calculations;
(ii) Curve function parameter values;
(iii) Loop counters;
(iv) Dash start and end points; and
(v) Bezier function parametric t values.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the curve vectorisation program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 5:
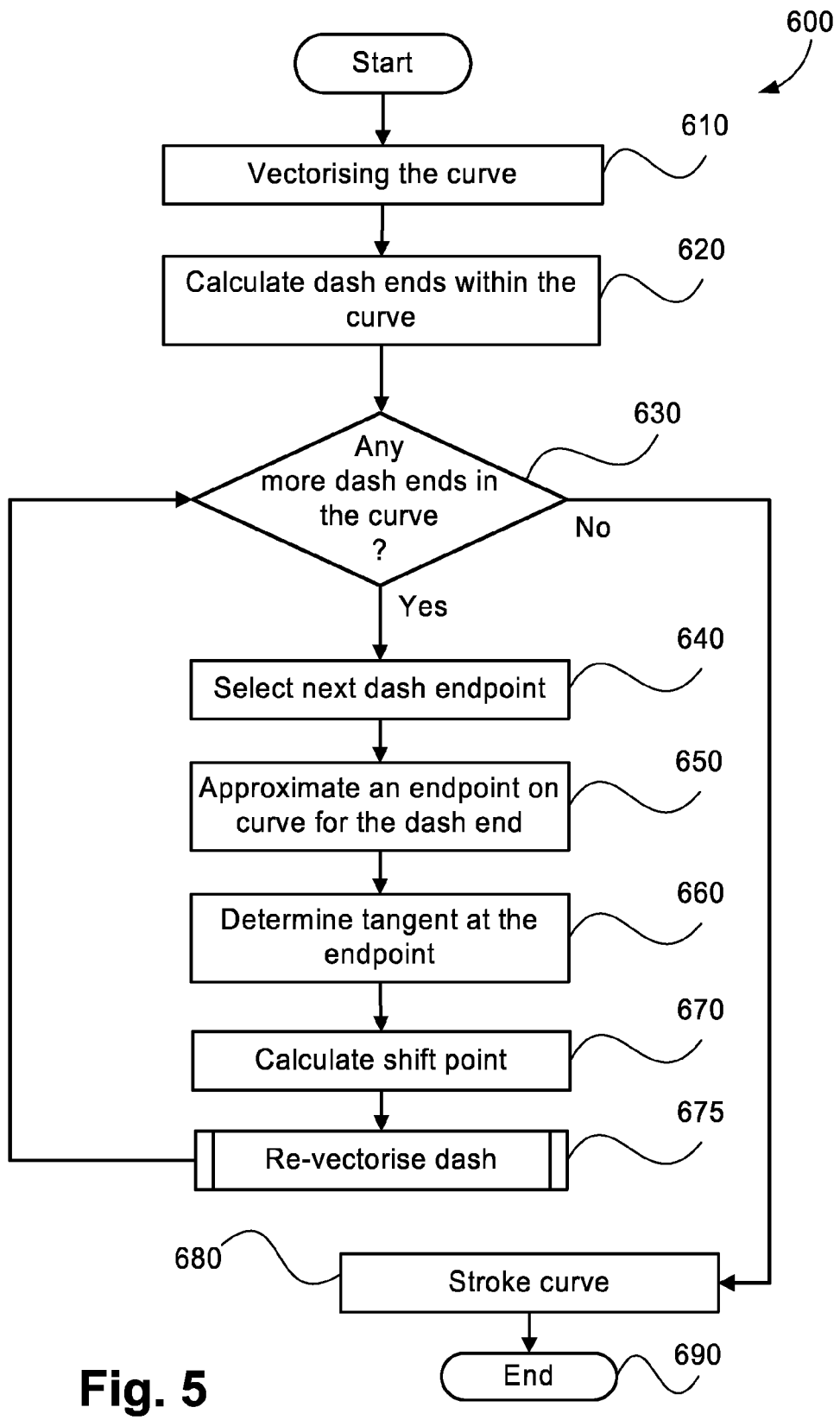
FIG. 5 is a schematic flow diagram illustrating a method of stroking a Bezier curve.
Figure 7:
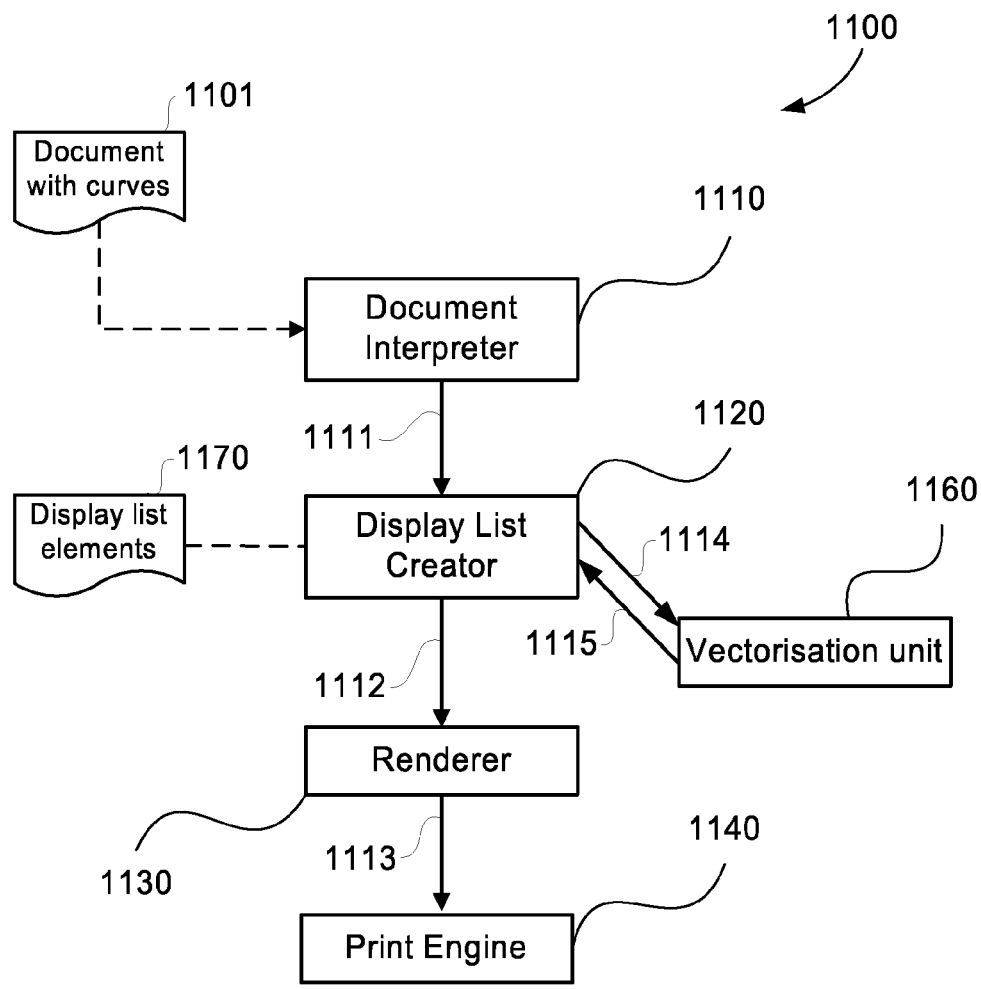
FIG. 7 is a schematic block diagram of a data-processing architecture according to a printing arrangement.

Each step or sub-process in the processes of FIG. 5 and FIG. 7 is associated with one or more modules of the curve vectorisation program 133, and is performed by the register section 144-146, the ALU 140, and the control unit 139 in the processor 105 working together to perform the fetch, decode, and execute cycles for every instruction in the instruction set for the noted segments of the program 133.

The curve vectorisation method may alternatively be implemented in dedicated hardware such as one or more gate arrays and/or integrated circuits performing the curve vectorisation functions or sub functions. Such dedicated hardware may also include graphic processors, digital signal processors, or one or more microprocessors and associated memories. If gate arrays are used, the process flow charts in FIGS. 6, 7 and 11 may be converted to Hardware Description Language (HDL) form. This HDL description may be converted to a device level netlist which is used by a Place and Route (P&R) tool to produce a file which is downloaded to the gate array to program the gate array with the design specified in the HDL description.

Although the curve vectorisation arrangement in FIGS. 5, 6 and 7 shows the curve vectorisation process being effected in the free standing computer 101, the curve vectorisation arrangement may also be implemented in the printer 115 itself or elsewhere in a networked system. The curve vectorisation arrangement may also be implemented using other arrangements of functional modules.

FIG. 7 is a functional block diagram of a data processing architecture 1100 of a printing arrangement according to the present disclosure. The data processing architecture 1100 may be implemented as at least part of the printing application program 133 referred to above and may be invoked when a printing function is selected by an application (not shown) executing on the computer system 100. That application may process any source of printable data containing a dashed curve such as a word processing application, a browser, a graphics drawing package, and so forth.

The data processing architecture 1100 operates on a page description of a page that is to be printed. The page to be printed may comprise a dashed curve. In this regard, the data processing architecture 1100 may execute within the computer module 101 to interpret and render the page description of a dashed curve into line segments for reproduction on the printer 115. Alternatively, the data processing architecture 1100 may execute within the printer 115 which receives a page description from the computer module 101. In this printing arrangement the printer 115 performs the document interpreting and rendering as part of the reproduction process.

In this data processing architecture 1100 the document comprising the input curve 1101 that is submitted for printing is received from the computer module 101 and interpreted by a document interpreter 1110. The document interpreter 1110 generates drawing commands which are sent, as depicted by an arrow 1111, to a display list creator 1120. The display list creator 1120 translates the drawing commands into display list elements 1170. When the creation of a display list for a single page is complete, the display list is sent, as depicted by an arrow 1112 to a renderer 1130, for rendering. The Display List is in a format that can be easily processed by the renderer 1130. The renderer 1130 processes the Display List and generates pixel data which is sent, as depicted by an arrow 1113 to a print engine 1140 in the printer 115 for printing on hard copy. The document interpreter 1110, the display list creator 1120 and the renderer 1130 may implemented as software modules in the software application 133 executing on the computer module 101, or as a separate purpose-designed hardware (or hybrid hardware/software) module executing on the printer 115.

The Display List Creator 1120 stores display list elements in the memory 106 as the display list is built. When the display list is completed, the display list is sent, as depicted by the arrow 1112, to the renderer 1130. The renderer 1130 reads the display list elements from the memory 106, for example when the architecture 1100 is formed within the computer module 101. The renderer 1130 is optimised to render straight lines, and as such, all the dashed curve drawing commands passed in from the document interpreter 1110 must be converted by the display list creator 1120 into straight lines. This conversion is done by the vectorisation unit 1160. The display list creator 1120 passes the necessary data describing the dashed curve, as depicted by the arrow 1114, into the vectorisation unit 1160. The vectorisation unit converts the dashed curve into a series of sets of straight lines, known as a path, and returns data describing the path, as depicted by the line 1115, to the display list creator 1120 for inclusion into the display list elements 1170. The vectorisation unit represents the process as described with FIG. 5.

Overview

Electronic documents commonly contain curved lines (e.g. vector graphics) which may have a dash pattern applied to them. Electronic documents will typically define the curve using a mathematical representation of the centre line of curve. For example a Cubic Bezier curve is defined by its four control points. Further parameters specify the stroke width of the curve, the cap type to be applied at the end of dashes (examples include round, flat, triangle or square caps), flatness tolerance, and a dashing pattern.

A common method for rendering curved lines is to vectorise the curve into a series of straight lines, commonly referred to as straight line segments. The straight line segments, taking into account the specified flatness tolerance, form a path that is an approximation of the centre line of the stroked curve. The vectorisation is performed to the specified flatness tolerance which defines the maximum distance by which any part of the vectorised curve might deviate from the curve. The dashing pattern is then applied to determine where each dash starts and ends along the vectorised path.

Using the stroke width and end cap type, an outline path, representing the stroked dash, is created which is then filled by the renderer 1130 to generate the stroked dash.

The outline of the centre line path is generated by considering each straight line segment of the vectorised curved dash in turn. Points perpendicular to the segment, and half stroke width distance from the start and end of each straight line segment, are calculated for both sides of the segment. Further points may be added between the segment outline points in order to maintain the representation of a smooth outline curve. This is typically done by using a round join. Additional outline points are generated at the start and end of dash to represent the end cap type.

Note that the outline path representing the stroked curved dash must be within flatness tolerance of the ideal stroked curved dash.

The renderer 1130 will then fill the outline of the stroked path to generate the output for printing or display on the target device.

Those familiar with curve rendering will appreciate that, except for a single point on each vectorised straight line segment, the tangent to the curve will not exactly match the tangent to the vectorised straight line segment at points along the vectorised straight line segment. Therefore if the dash ends at one of these points, the angle of the stroked dash end will not be exactly perpendicular to curve.

Figure 3:
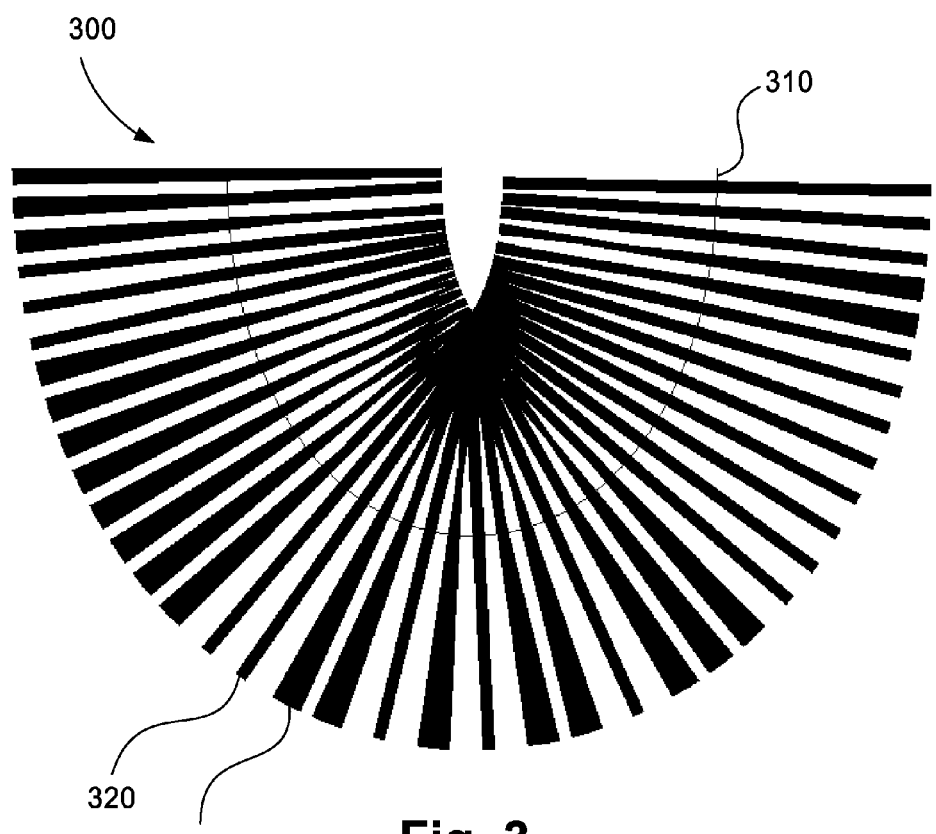
FIG. 3 is an example of prior art stroking of a dashed Bezier curve.

An example of the prior art is dashed curve 300, shown in FIG. 3. Centreline 310 shows the path of a Bezier curve. This same curved path is dashed with a wide stroke that has short dash and gap lengths, to produce a prior art stroked shape 300. Inconsistent dash shapes can be seen, for example dash 320 shows a rectangular dash when it should be a wedge, and dash 330 shows a wedge that is excessively wide at the bottom.

Another approach, is to utilise the mathematical representation of the curve to directly calculate the entry and exit angle or slope for the curve, and to insert short segments into the start and end of the vectorised curve, such that the entry and exit angle of the vectorised curve preserves the tangent to the curve at the endpoints. However, this approach will only preserve the entry or exit angle of a dash that begins or ends at the start or end of the vectorised curve. For example if this approach is applied in reference to the prior art stroked shape 300, only the first dash begins at the start of the curve and so only the entry angle of this dash will be preserved. All other dash end entry and exit angles will not be preserved and inconsistent dash shapes will still occur.

The arrangements presently disclosed insert short segments into the start and end of each dashed, vectorised, sub-curve, such that the entry and exit angle or slope to the sub-curve closely approximates the tangent to the curve near those dash endpoints, while utilising as many of the existing points of the original vectorised curve as possible. An advantage of the present approach is that it provides consistent dash shape with preserved angles without increasing number of segments for curve vectorisation (i.e. without decreasing a pre-determined flatness tolerance for vectorisation). This provides that time required for dashing would be compatible with time required for general stroking operation within a regular flatness tolerance for vectorization.

Figure 4:
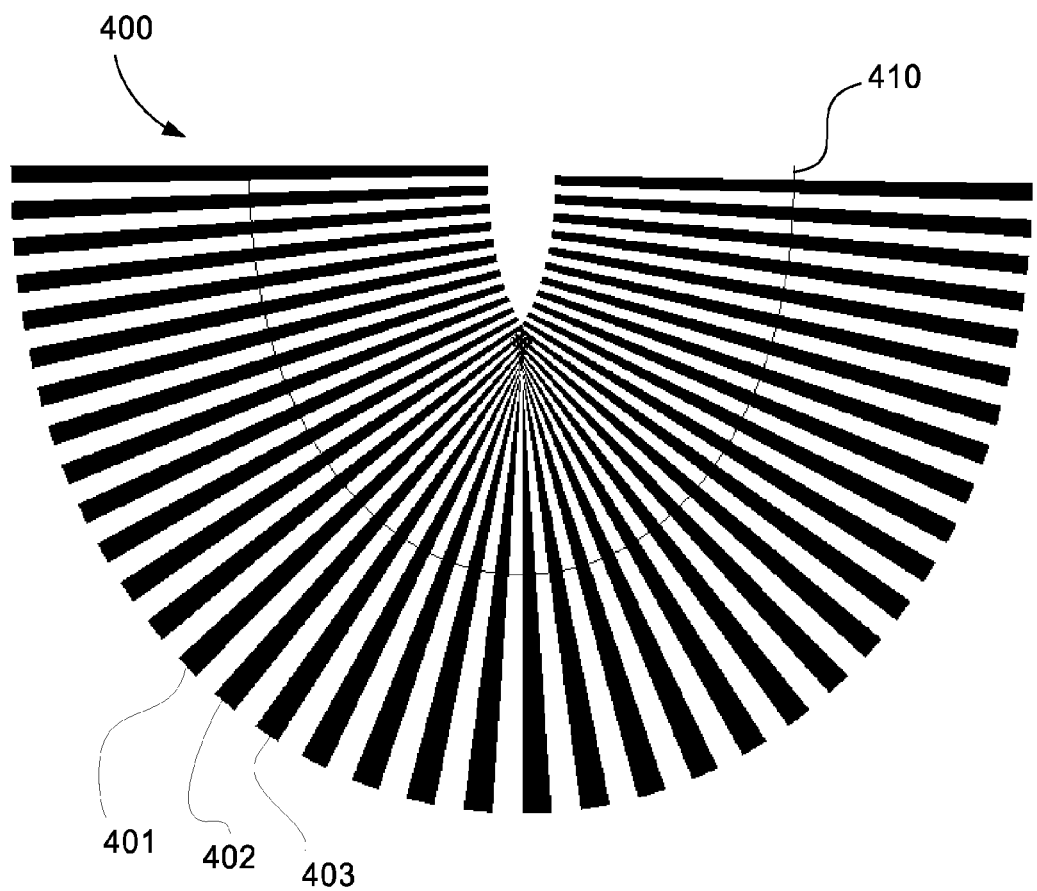
FIG. 4 is an example of the application of stroking according to the present disclosure to a dashed Bezier curve.

FIG. 4 shows an example rendered output 400, with application of the presently disclosed arrangements, where a Bezier curve shown by centreline 410 is dashed with a relatively wide stroke width and short dash and gap lengths. The consistent shape of the dashes (e.g. 401, 402 and 403) in FIG. 4 is evident in comparison to the prior art stroked shape 300.

In the examples of FIGS. 3 and 4, the stroke width is much greater than the dash on-off rate, thereby making the dashes to appear transverse the path of the curve. Another way of interpreting FIGS. 3 and 4 is that the dashes are much shorter than the width of the curve. The important consideration in comparison between FIGS. 3 and 4 is that according to the presently disclosed arrangements, the dash is made perpendicular, or at least substantially perpendicular to the curve, rather than perpendicular to the vectorised curve.

Implementation 1

FIG. 5 schematically depicts a process 600 which performs dash end alignment. The process 600 is typically performed by software executing within the computer module 101 on the processor 105.

The process 600 begins at step 610, where a curve is received and vectorised by the processor 105, based on a pre-determined flatness tolerance. The flatness tolerance specifies the maximum distance by which any part of the vectorised curve might deviate from the Bezier curve. The curve is preferably a cubic Bezier curve, but could also be another curve such as a quadratic Bezier curve, a B-Spline, or an elliptical curve. For purposes of illustration a cubic Bezier curve is considered though the process 600 could easily be adapted to apply to other types of curves. A cubic Bezier curve is defined in terms of a parametric variable, t. The parametric equation of a cubic Bezier curve is defined as:

$$B(t)=P_0(1-t)^3+3P_1t(1-t)^2+3P_2t^2(1-t)+P_3t^3 \qquad \text{(Eqn. 1)}$$

where t is a subset of the domain 0, 1. The curve beings at $P_0$ and ends at $P_3$. The start (end) of the curve is tangent to the first (last) section of the Bezier polygon formed by control points $P_0$, $P_1$, $P_2$ and $P_3$.

In the arrangements and examples described herein, a consistent coordinate space is used which is referred to as the stroking coordinate space. The distance between any two points in the stroking coordinate space is the Euclidean distance, which is the length of the line segment between these two points.

Figure 2:
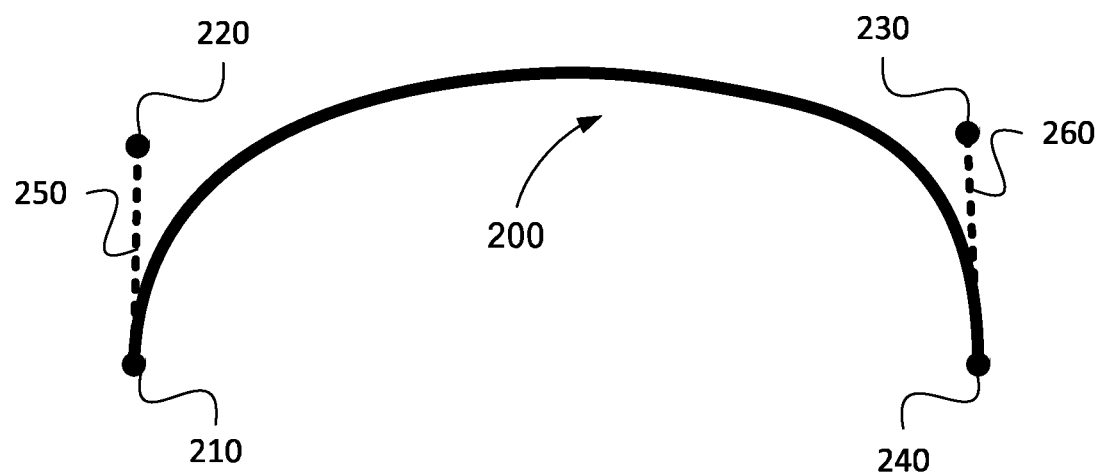
FIG. 2 is an example of a cubic Bezier curve with four control points shown.

With reference to FIG. 2, the Bezier curve 200 is defined by four control points herein referred to as p1 210, p2 220, p3 230 and p4 240 where p1 (210) is the first control point, which coincides with the start point of the curve 200, p2 (220) is the second control point, p3 (230) is the third control point, and p4 (240) is the last control point which coincides with the end point of the curve 200.

The Bezier curve 200 is vectorised using the provided Bezier curve control points (210-240) and the pre-determined flatness tolerance to produce a series of points, which, when connected in sequence by straight lines, comprise the vectorised curve. In addition, the Bezier parametric value t for each point of the vectorised curve is stored. There are a number of well-known techniques, such as recursive subdivision or fixed depth tessellation which can be used to vectorise the curve 200 at step 610.

Figure 8:
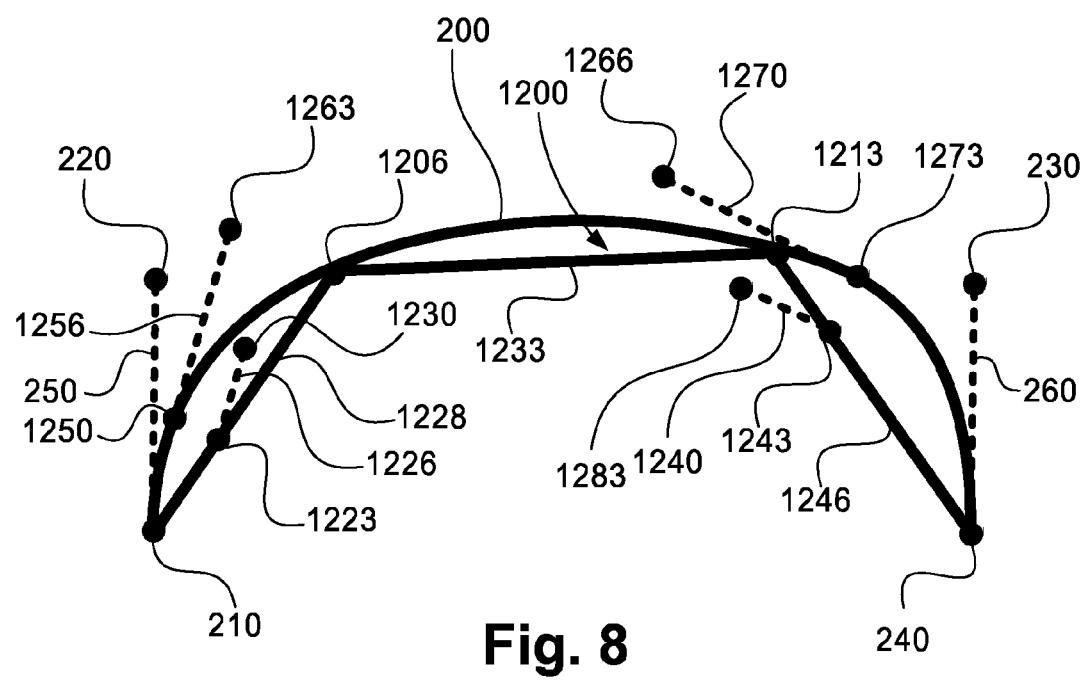
FIG. 8 is an example of the interim steps used to generate a vectorised sub-curve generated by the sub-curve vectorisation arrangement of FIG. 5.

For example, with reference to FIG. 8, a vectorised curve 1200, determined from the example Bezier curve 200, is formed using vectorization points 210, 1206, 1213 and 240. The vectorization points 210, 1206, 1213 and 240 establish linear segments 1228, 1233, and 1246 therebetween. The vectorization points 210, 1206, 1213 and 240 represent a set of intermediate points that characterize the vectorised curve.

Processing continues to step 620, in which the endpoints of each dash along the vectorised curve 1200 are determined based on the pre-determined dashing pattern.

For example for the vectorised curve 1200, a single dash is determined to be present which begins at point 1223 and ends at point 1243. The endpoint 1223 is on a first linear segment 1228 of the vectorised curve 1200.

The dashing pattern can be specified as an alternating series of dash and gap length values and a value that defines an offset into the dash/gap series to be applied before the series is applied. For example a dashing series of 10, 20, 30, 40 with a dash offset of 15 means that the dashing begins 5 units into the first gap. Therefore the resulting dash pattern is a gap of length 15, dash of length 30 and gap of length 40. The dashing pattern is typically received as part of a page display list (PDL) as generated by a computing device and sent to a printer for rendering. The PDL also includes data specifying the paths to be drawn, the stroking patterns to be applied to certain paths, the widths of the stroking patterns and any dashing patterns to be applied to the stroked paths. The dashing pattern specification is sufficient to determine the dash pattern to be applied to the entire length of the Bezier curve. This may be done by specifying that the dash series is repeated. For example, a dashing series of 10, 20 would repeat to be a dash series of 10, 20, 10, 20 . . . .

Each dash has two endpoints, the starting point of the dash and the ending point of the dash. For example for the vectorised curve 1200, a dash is defined to begin at point 1223 and end at point 1243.

Determining a point on the vectorised curve based on a distance along the vectorised curve is done by measuring the distance along the segments of the vectorised curve. For example a distance of 30 along two adjacent segments of length 20 each will give an endpoint halfway along the second segment.

If the dash pattern is such that the first point of the vectorised curve is within a dash, then the starting point of the first dash is the first point of the vectorised curve. If the dashing pattern is such that the last point of the vectorised curve is within a dash, then the ending point of the last dash is the last point of the vectorised curve. For example if the dash pattern is 10 dash, 20 gap, 30 dash, 40 gap, and the vectorised curve is composed of two segments, both of length 20. Then the first dash begins at the start of the vectorised curve (distance of zero along the curve) and will be 10 units long. Then there is a gap of 20 units. The vectorised curve has a total length of 40, which is 10 units into the 30 unit dash of the dash pattern. Therefore the second and final dash will be 10 units long and ends at the end of the vectorised curve.

The result of applying the dash pattern to the vectorised curve is a series of pairs of dash starting points and dash ending points along the vectorised curve, ordered in increasing distance, along the vectorised curve, from the start point of the vectorised curve (p1). If the entire length of the vectorised curve is contained within a gap of the dashing pattern, then there will be no endpoints in the series.

Processing continues to decision step 630, which determines whether there are any more dash endpoints in the dash endpoint series to be processed.

Steps 630 to 675 form a loop that processes dash endpoints in order, beginning with the first endpoint and ending with the last endpoint in the dash endpoint series.

The decision step 630 checks if there are any more dash endpoints to be processed. If decision 630 evaluates to YES, then the process proceeds to step 640, else, if the decision evaluates to NO, the process proceeds to step 680.

In processing step 640 the next dash endpoint in the dash endpoint series is determined. This point is referred to as the "reference point" in steps 640 to 675.

Processing continues to step 650 which approximates an endpoint on the curve that corresponds to the reference point by determining a Bezier parametric t value corresponding to the distance of the reference point along the vectorised curve. This point is referred to as the approximate dash endpoint.

There are various known methods to determine an approximate Bezier curve parametric t value that corresponds to a position along the vectorised curve. In the present exemplary implementation linear interpolation is applied to the Bezier parametric t value for the closest segment endpoints of the vectorised curve before and after the reference point, noting that all these segment endpoints of the vectorised curve also lie on the Bezier curve. In this manner an approximate t value can be computed, which is used to determine a point on the Bezier curve that approximates the dash endpoint on the curve.

For example for the vectorised curve 1200, in order to determine the approximate t value that corresponds to the dash start endpoint 1223, linear interpolation may be applied using the known t values at the closest segment end points 210, $t_0$ and 1206, $t_1$, the length of the segment, $l_{seg}$, and the length from points 210 to 1223, $l_{ds}$. The approximate t value is given by, $$t = (l_{ds}/l_{seg})*(t_1-t_0)+t_0.$$

Processing continues to step 660 which determines a tangent to the curve at the approximate dash endpoint. Preferably, a method of determining a Bezier sub-curve of the Bezier curve, ending at the approximate dash endpoint is used to determine the tangent at the point. The line joining the endpoint (first Bezier control point) and the second Bezier control point of the sub-curve is a tangent to the curve at the endpoint such that the vector formed from the endpoint to the second control point is in the direction of the sub-curve. The Bezier sub-curve control points can for example be calculated by De Casteljau's algorithm, given the Bezier parametric t value of the approximate endpoint calculated in step 650, and the Bezier control points for the curve 200. For example, in FIG. 2, line 250 joining endpoint 210 and second control point 220 is the tangent to endpoint 210. Similarly, line 260 joining endpoint 240 and third control point 230 is the tangent to endpoint 240.

Alternatively an approximate tangent can be determined by fitting a circle to the arc of the Bezier curve around the dash endpoint or using the rate of change in angle of the two straight line segments adjacent to the endpoint.

Processing continues to step 670 in which an additional point, referred to as the "shift point", is calculated for insertion into the vectorised curve, and the dash centreline is at least partially re-vectorised. The shift point is calculated to be a point close to the reference point, such that a line formed by the reference point and the shift point is parallel to the tangent of the curve 200 calculated in step 660. Further, the shift point must be within the pre-determined flatness tolerance of the curve and in the direction of the sub-curve. Preferably, the distance between the shift point and the reference point is as small as practical such that the direction of the vector formed by these two points can be sufficiently accurately represented and processed, given the constraints of the numerical accuracy of the processor 105. FIG. 8 shows the calculated shift point 1230 from reference point 1223. Typically the shift point is positioned within or at approximately half the flatness tolerance from the curve.

For example, if one degree of accuracy is required, and 28.4 fixed point arithmetic is used, the smallest number that can be defined is binary 0.000 1b, or decimal 0.0625. The largest error occurs in a change of angle around either the x or y axis. To ensure a maximum error of 1 degree, the diameter of a circle would be 360*0.0625=22.5 (by approximating that an arc length of 1 degree around the axis has a distance of 0.0625). The radius of this circle is 22.5/2/pi~=3.58, which defines the minimum distance of the shift point from the reference point to ensure 1 degree accuracy in the tangent.

Processing proceeds to step 675 where the dash centreline is at least partially re-vectorised as follows.

If the reference point represents the start of a dash, then the reference point and shift point are stored as a partial representation of the vectorised dash centreline. For example in FIG. 8 the partial representation comprises the reference point 1223 and shift point 1230.

If the reference point represents the end of a dash then the stored reference point and shift point for the start of the dash is combined with the intermediate points on the vectorised curve between the starting point of the dash and the ending point of the dash, and the shift point and reference point for the end of the dash. The resulting series of points is stored as the complete representation of the vectorised dash centreline. For example in FIG. 8, the representation of the complete dash comprises the stored reference point 1223 and shift point 1230 for the start of the dash are combined with intermediate points 1206 and 1213, end of dash shift point 1240 and end of dash reference point 1243.

Upon completion of step 675, processing returns to decision step 630 where the condition is rechecked. When there are no more dash endpoints to be considered, the process 600 continues to step 680.

In step 680 all of the zero or more vectorised dashes that are stored are stroked by a stroking process, sometimes called a "stroker".

The stroking process is provided with stroking parameters that include the width of the stroke, and the cap style to be applied to the start and end of dashes To join the straight line segments of a vectorised curve, a round join is preferably used.

The stroker generates an outline for each vectorised dash centreline. The outline is subsequently filled by a renderer to generate the final stroked dash. Such shapes are represented for example in FIG. 4 using labels 401, 402, 403 with respect to a number of stroked dashes. Notably, each stroked dash 401, 402 and 403 in FIG. 4 has an end cap formed by the substantially elongated sides of the respective trapezoid like shape and, absent any rounding or other extraordinary shaping, as illustrated is indicative of a butt endcap. In FIG. 4, the outer edge of each illustrated "fan blade" is composed of two straight lines forming a very shallow wedge.

The outline of each shape 401, 402, 403 is generated by calculating points that are perpendicular to the start and end of each line that comprises the vectorised dash, half the stroke width distance from the centre line. These points are then joined with points using the specified line join, and end caps points are calculated. The result is a closed path that can be filled by a renderer. Processing proceeds to step 690, which is the end of process 600.

The insertion of shift points within the vectorised dash ensures that each end cap is substantially perpendicular to the tangent of the curve, as exemplified later in this description with respect to FIG. 10.

A dash may continue beyond the end of a single vectorised curve, for example at a join with another vectorised curve. In this case the stroker can store the received vectorised curve and only perform stroking once all segments comprising the dash are received.

Implementation 1 above describes a basic method, but without further processing, stroking artefacts may result. Methods to remove stroking artefacts are covered in Implementations 2, 3 and 4 described below.

Example 1

An example of process 600 is now provided with reference to FIG. 5, FIG. 2, FIG. 8 and FIG. 10, implementing a process to provide the stroked dashes to be at least substantially perpendicular to curve.

In step 610 of process 600, a curve 200 as depicted in FIG. 2 having control points 210, 220, 230 and 240 is vectorised to a pre-determined flatness tolerance of 10 units. FIG. 8 illustrates the Bezier curve 200 that has been vectorised. The vectorised curve 1200 is defined by the series of points for vectorisation 210, 1206, 1213 and 240, and consists of segments 1228 of length 30, 1233 of length 50, and 1246 of length 30.

Step 620 receives a dash pattern containing alternating dash and gap lengths which are all of length 80, and a dash offset of 150. The vectorised curve 1200 is therefore dashed beginning at a point 70 units into a gap of length 80. The first dash endpoint 1223 is therefore determined 10 units into segment 1228. A second dash endpoint 1243 is 80 units further along the vectorised curve 1200, or 10 units into segment 1246. No further dash endpoints beyond this single pair occur within vectorised curve 1200. Because the vectorised curve 1200 both starts and ends in a gap, the endpoints of the curve are not considered as endpoints of a dash.

Step 630 then determines that neither of the two dash endpoints have been processed yet. Therefore the process 600 proceeds to step 640 which selects the first dash endpoint 1223 as a reference point for further processing.

In step 650, linear interpolation is applied to find an approximate t value for the reference point 1223. The points for vectorisation of the curve 200 for which t values are known, and which are closest to the reference point on either side, can be used to find an approximate t value for the reference point 1223. In this particular example those points are the points 210 and 1230. The t values of these points ($t_A=0$, $t_B=0.39$) are interpolated linearly to approximate at value corresponding to reference point 1223 ($t_R=0+(0.39-0)*(10/30)=0.13$). Interpolation is performed based on length in units of the segment 1228 and an offset in units of the dash endpoint 1223 relative to at least one of segment endpoints 210 or 1230.

In step 660, De Casteljau's algorithm is applied using t values 0.13 (the approximate t value of the curve 200 for dash endpoint 1223), and 1.0 (the t value at the end 240 of the curve 200), to determine the control points of a Bezier sub-curve spanning between those two t values. A first control point 1250 and a second control point 1263 are determined in this way, and the vector between these control points provides the tangent to the curve 200 at the approximate dash endpoint 1250. Other associations may be established to determine a first control point 1250. For example, the association between the reference point 1223 and the point 1250 is that the point 1250 is at the intersection of the curve 200 and a line perpendicular to the vectorization segment 1228 and passing through the reference point 1223. Alternatively, for example, the first point 1250 may be that point on the curve closest to the endpoint 1223. In the actual implementation illustrated, the point 1250 is calculated using De Casteljau's method in step 660. The line between point 1223 and point 1250 is not exactly perpendicular to the line 1226, though typically it might be close.

Step 670 calculates a position of the shift point 1230 a short distance (within the flatness tolerance) from the reference point 1223, such that a line 1226 between the shift point 1230 and the reference point 1223 is parallel to a line 1256 tangential to the curve 200 at the point 1250 associated with the reference point 1223. In some embodiments a location of the shift point 1230 can be determined in respect to the reference point 1223 and at least one point for vectorisation, for example point 1206.

In step 675, since the dash endpoint represents the start of a dash, the reference point 1223 and shift point 1230 are stored for future use, as a first part of a re-vectorised dash.

Step 630 determines that the second dash endpoint has not been processed yet. Therefore the process 600 proceeds to step 640 which selects the second dash endpoint 1243 as a reference point for further processing.

In step 650, linear interpolation is applied to find an approximate t value for the reference point 1243. The points on the curve 200 for which t values are known, and which are closest to the reference point on either side, are the points 1213 and 240. The t values of these points ($t_A$=0.58, $t_B$=1.0) are interpolated linearly to approximate at value corresponding to reference point 1243 ($t_R$=0.58+(1.0−0.58)*(10/30) =0.72).

In step 660, De Casteljau's algorithm is applied using t values 0.72 (the approximate t value of the curve 200 for dash endpoint 1243), and 0.0 (the t value at the start 210 of the curve 200), to determine the control points of a Bezier sub-curve spanning between those two t values. The first control point 1273 and second control point 1266 are determined in this way, and the vector between these control points provides the tangent to the curve 200 at the approximate dash endpoint 1273.

Step 670 calculates the shift point 1283 a short distance (within the flatness tolerance) from reference point 1243, such that the line 1240 is parallel to the line 1270.

In step 675, since the dash endpoint represents the end of a dash, the stored reference point 1223 and shift point 1230 for the start of the dash are combined with intermediate points 1206 and 1213, end of dash shift point 1240 and end of dash reference point 1243 to form the complete centreline of the vectorised dash.

Step 630 determines that all dash endpoints of the vectorised curve 1233 have been processed. Therefore the process proceeds to step 680 in which an outline of the vectorised dash centreline is generated.

A pre-determined stroke width of 20 units, and dash start and end caps of type "butt" are used.

Figure 10:
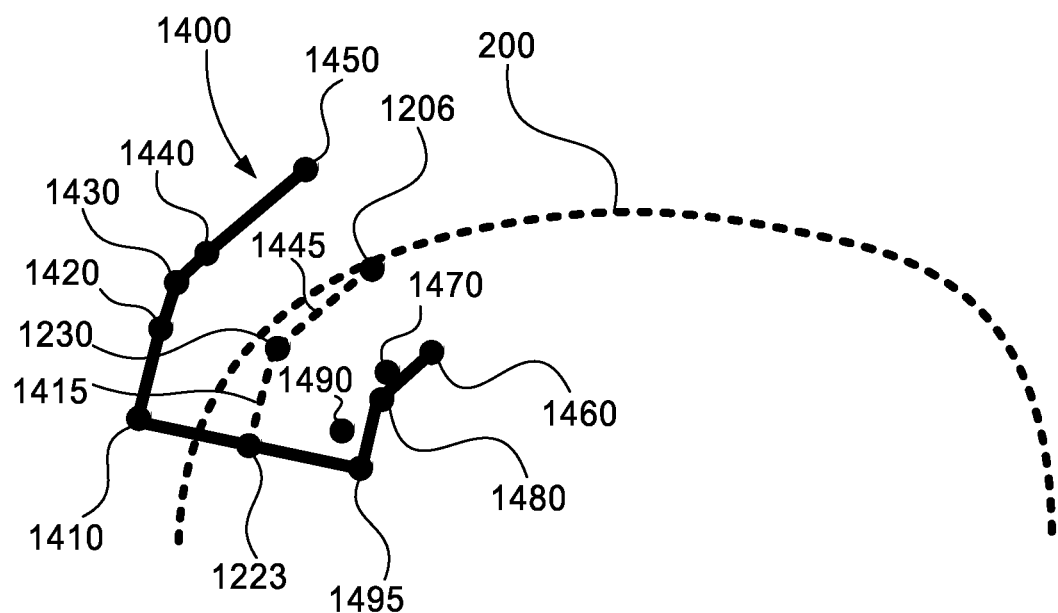
FIG. 10 is an example of determining part of the outline for the vectorised sub-curve of FIG. 8.

Outline points 1410 and 1495, seen in FIG. 10, are calculated to be perpendicular to a first centreline segment 1415, at a distance of half the stroke width, 10 units, from the first centreline point 1223. The line formed by outline points 1410 and 1495 comprises an endcap which forms the start of the dash which, as stated above, is substantially perpendicular to the tangent of the curve 200. Since the end cap type is butt, no additional outline points are required.

Outline points 1420 and 1470 are similarly calculated to be perpendicular to the segment 1415 from point 1230, again 10 units distant from the centreline.

For a second centreline segment 1445, outline points 1440 and 1490 are calculated to be perpendicular to the segment 1445 from point 1230, while outline points 1450 and 1460 are calculated to be perpendicular to the segment 1445 from point 1206.

The turn direction from the first centreline segment 1415 to the second centreline segment 1445 is determined to be to the right so the left-hand-side outline points 1420 and 1440 are on the outside of the curve and a round join is applied between them resulting in the insertion of point 1430. For sharper angles additional joining points would be added to better approximate a circular arc. It will be appreciated from the development of the described and illustrated example from FIGS. 8 to 10, that an initial or first vectorization, exemplified by segments 1228, 1233, 1246, of the curve 200 as seen in FIG. 8, is resolved into a second or further segmentation exemplified by centreline segments 1415 and 1445 of the curve 200 as seen in FIG. 10. In the illustrated example, the segment 1228 of the initial (first) vectorisation is resolved into the two segments 1415 and 1445 of the further (second) vectorisation. It is to be noted that although present in the particular example illustrated, any 1:n concordance between the first and second vectorizations is not implied or intended. For example, for any vector of the first vectorization, there need not be a whole number of vectors in the second vectorization. Further, the second vectorization may have differing numbers of vectors across those sections that may concord with vectors of the first vectorization. [The second vectorization formed in this example to include the segments 1415 and 1445 is a dashed vectorization of the curve 200 and which forms a path comprising at least a first segment 1415 joining the reference point 1223 and the shift point 1230, and a second segment joining the shift point 1230 and a further point 1206. The location of the further point 1206 is determined using at least a length of the dash.

Right-hand-side outline points 1470 and 1490 are on the inside of the curve. The inside join can be formed from outline points 1495, 1470, 1490 and 1460. However, points 1470 and 1490 may be removed by calculating that the intersection between the line formed between points 1495 and 1470 and the line formed between points 1490 and 1460 is point 1480. Point 1480 is inserted as a new outline point and points 1490 and 1470 are removed from the outline.

So far, a partial outline of the stroked dash 1400, comprises, a series of points, 1460, 1480, 1495, 1410, 1420, 1430, 1440 and 1450.

Processing then proceeds in a similar manner for the remaining segments of the vectorised curve to add to the partial series at both its beginning end (for points on the left-hand-side of the dash outline) and the finishing end (for points on the right-hand-side of the dash outline).

When the entire series of points that forms the outline of the dash has been generated, the points are treated as a closed path of line segments, which is then filled by the renderer to generate the final stroked dash.

Implementation 2

In another implementation, step 675 of process 600 is replaced by a process 700, described in reference to the schematic block flow diagram of FIG. 6, which adjusts the location of points to ensure flatness tolerance is maintained and avoiding undesirable artefacts in the stroked output.

The process 700 begins at decision step 710, which determines whether the endpoint is located at the start/end of the curve or else somewhere inside the curve. If the decision evaluates to NO, then the process proceeds to step 715.

In processing step 715, an approximate Bezier parametric t value is determined for the shift point. In this implementation the vector formed from the reference point to the shift point is projected onto the vector formed by the reference point and the first intermediate point. Then linear interpolation or extrapolation is used to determine the approximate t value for the shift point on the curve.

Processing continues to step 720, which removes from the series of intermediate points any intermediate points that have t values that are equal to or between the t values of the reference point and the shift point. These points are no longer required since the shift point has been calculated such that the straight line between the reference point and shift point is within flatness tolerances of the curve, and keeping these intermediate points would result in the curve turning back on itself. As such the removal of those intermediate vectorization points of the initial vectorization 1200 can be based upon the extent of curvature of the curve in the vicinity of the relevant intermediate point. The removal can also be based upon the position of either or both of the shift point and the reference point.

Processing continues to step 725, which calculates the location of a modified shift point which lies on the curve by applying the parametric cubic Bezier equation (Eqn. 1) and the approximate t value for the shift point calculated in step 715. For example, in FIG. 12, the modified shift point for shift point 1630 is moved to the point 1650 on the curve 200.

Processing continues to step 730, which translates the position of the line formed from the reference point to the shift point such that the shift point is moved to be located at the position of the modified shift point calculated in step 725. The reference point (being an endpoint) is moved accordingly so that its position relative to the shift point remains unchanged. For example in FIG. 12, the reference point 1620 is moved to point 1640.

By locating the approximate shift point on the curve, the resulting lines from the reference point to the shift point, and from the shift point to the next intermediate point will be within the specified flatness tolerance.

Processing proceeds to step 753 which re-vectorizes the dash.

If the decision of decision step 710 evaluates to YES, then the process 700 proceeds to step 740, in which the location of the shift point along the vector formed by the reference point and the shift point is adjusted if necessary to ensure that the length of the line is less than or equal to half the flatness tolerance. Typically this length will already be less than half the flatness tolerance.

Processing continues to step 745 which calculates a new intermediate point along the curve, using the Bezier parametric t value of the reference point as the start of the curve, and using half the specified flatness tolerance. This point is calculated in the same manner that the original curve was vectorised in step 610 and inserted into the series of intermediate points.

Processing continues to step 750 which removes any intermediate points that have Bezier parametric t values between the reference point and the new intermediate point. This ensures that the new intermediate point is the next intermediate point in the series.

Where the distance from the reference point to the shift point is less than or equal to half the flatness tolerance, and the maximum error from the reference point to the first intermediate point is within half the specified flatness tolerance, then the resulting lines from reference point to shift point to first intermediate point will remain within flatness tolerance of the curve. Preferably, the distance between the shift point and the reference point is as small as practical such that the direction of the vector formed by these two points can be accurately represented and processed, given the constraints of the numerical accuracy of the processor 105.

Processing continues to step 753.

In step 753, if the reference point represents the start of a dash then the reference point and shift point are stored as a partial representation of the vectorised dash centreline.

Otherwise, if the reference point represents the end of a dash then the stored reference point and shift point for the start of the dash is combined with the intermediate points on the vectorised curve between the starting point of the dash and the ending point of the dash (that were not removed in step 720 or 750), and the shift point and reference point for the end of the dash.

Processing then proceeds to decision step 755, which determines whether the dash endpoint is the end of the dash.

If decision step 755 evaluates to YES then processing continues to step 760, else if the decision evaluates to NO, the process ends at step 770.

Step 760, detects whether the vectors between the reference point and shift point at the start of dash and end of dash cross over. This situation can occur when the dash length is very short. If the Bezier parametric t value of the start of dash shift point is larger than that of the end of dash shift point then an intersection is found between the two vectors and this single intersection point replaces the original start of dash and end of dash shift points.

The process then ends at step 770.

Example 2

Figure 12:
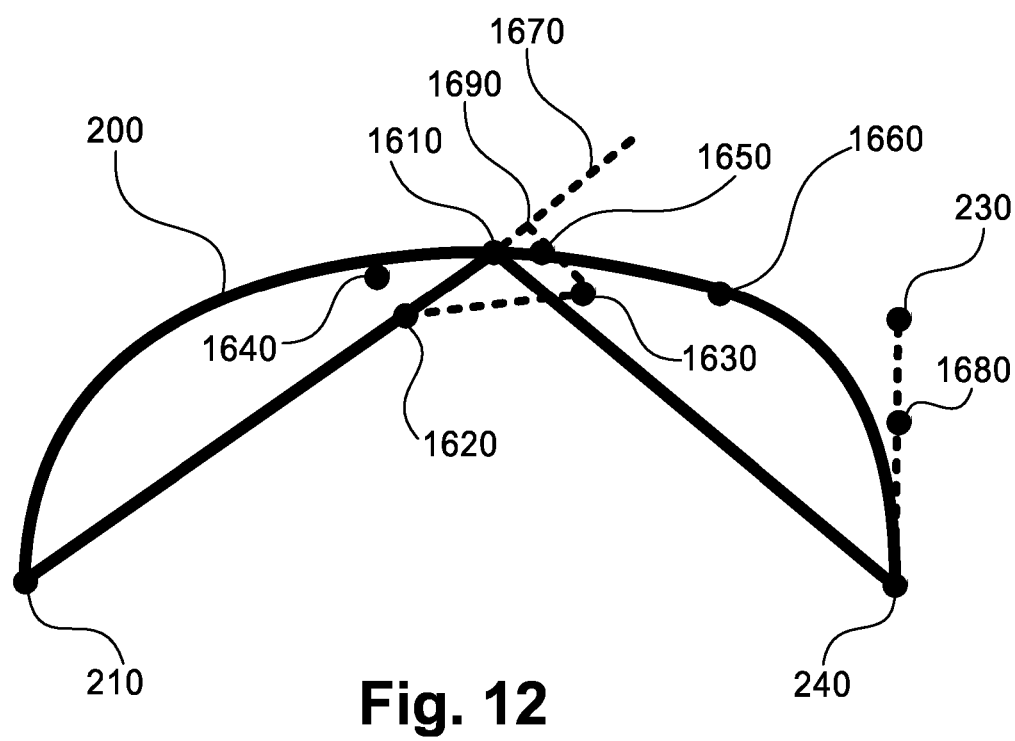
FIG. 12 is a further example of segmentation of a curve.

An example of process 700 is now provided with reference to FIG. 5, FIG. 6 and FIG. 12.

The defined flatness tolerance is 10.

Process 700 is first invoked with reference point 1620, shift point 1630, and first intermediate point 1610. Reference point 1620 has at value of 0.4 (calculated in step 650 of process 600), and first intermediate point 1610 has at value of 0.5 (calculated in step 610 of process 600). The length of the segment from point 1620 to 1610 is 10.

In decision step 710 of process 700, it is determined that the end point 1620 is not located at the start/end of the curve so processing proceeds to step 715.

In step 715, a projection of the vector formed from the reference point 1620 to shift point 1630 onto the vector 1670 formed from the reference point 1620 to the first intermediate point 1610 is found to have a length of 12. Therefore the approximate Bezier parametric t value of the shift point is extrapolated to be $0.5+(0.5-0.4)*(12-10)/12=0.52$.

In step 720 it is determined that the first intermediate point 1610, with t value of 0.5, is between the approximate t value of the reference point (0.4) and shift point (0.52) so the first intermediate point 1610 is removed from the series.

In step 725 the Bezier equation, Eqn. 1, is applied to determine the x,y coordinates of approximate shift point 1650 on the curve 200.

In step 730 the line formed from the reference point 1620 to the shift point 1630 is translated such that the new shift point is located at approximate shift point location 1650, which results in the new location of the reference point being 1640.

In step 753, since the reference point represents the start of a dash, the new reference point 1640 and new shift point 1650 are stored for future use.

In decision step 755 the reference point is not the end of the dash so the sub-process 700 ends.

In the course of process 600, process 700 is invoked a second time with reference point 240, shift point 1680, and no intermediate points (first intermediate point 1610 was deleted at step 720 of first invocation of process 700). Reference point 240 has at value of 1.0 (calculated in step 650 of process 600). The distance from reference point 240 to shift point 1680 is 4.

Decision step 710 determines that the end point of the dash is the end point of the curve so processing proceeds to step 740.

In step 740, the length of the line from the reference point 240 to the shift point 1680, 4, is already less than half the flatness tolerance, 10/2=5, so the shift point 1680 does not need to be relocated.

In step 745 a new intermediate point is calculated on the curve 200, from the t value of reference point 240 which is 1.0, using a flatness tolerance of 5 (half the specified flatness tolerance of 10) which results in a new intermediate point 1660 with at value of 0.7.

In step 750 there are no intermediate points between reference point 240 and new intermediate point 1660, therefore no intermediate points in the series are removed.

In step 753, the reference point 240 represents the end of the dash so the stored reference point 1640 and shift point 1650 for the start of the dash are combined with the new intermediate point 1660, end of dash shift point 1680 and end of dash reference point 240 to form the centreline of the vectorised dash.

Decision step 755 determines that the dash endpoint is the end of the dash so proceeds to step 760.

In step 760 the start of dash shift point 1650 with t value of 0.52 is less than the approximate t value 0.87 for the end of dash shift point 1680, therefore the shift points are deemed to not cross and the process ends.

The final vectorised dash centreline is composed of the points 1640, 1650, 1660, 1680 and 240.

Implementation 3

In another implementation, additional processing is performed in dash re-vectorisation step 675 to avoid a potential undesirable inflection (change of direction of curvature) in the vectorised dash curve, caused by the insertion of the shift point. The extra processing involves potential re-positioning of the shift point, and deletion of an intermediate point.

Even when the distance between the shift point and the reference point is very small, it is still possible for cases to arise where an undesirable change in the turning direction of the re-vectorised dash is created due to insertion of the shift point. An example of this can be seen in FIG. 8, in which the vector formed by shift point 1283 and intermediate point 1213 turns to the right relative to the vector formed by reference point 1243 and shift point 1283 while the original turn direction of the vector formed by intermediate points 1213 and 1206 relative to the vector formed by reference point 1243 and intermediate point 1213 is to the left. Undesirable artefacts can result when stroking a vectorised curve containing an inflection not present in the original curve but represented by the vectorised curve.

In this implementation, dash vectorisation step 675 additionally determines whether the turn direction of the vector from the shift point to the first intermediate point, relative to the vector formed by the reference point and shift point is different from the turn direction of the vector formed by the first intermediate point to the next intermediate point relative to the vector formed by the reference point to the first intermediate point. If so, then the shift point is re-positioned onto the intersection of the line from the reference point to the original shift point, and the line formed between the first and next intermediate point, and the first intermediate point is also deleted or marked for deletion from the re-vectorised dash. In this way, the direction of the vector formed by the reference point and new shift point remains the same as the vector formed by the reference point and the original shift point, without introducing an undesirable inflection in the vectorised curve.

Example 3

Figure 9:
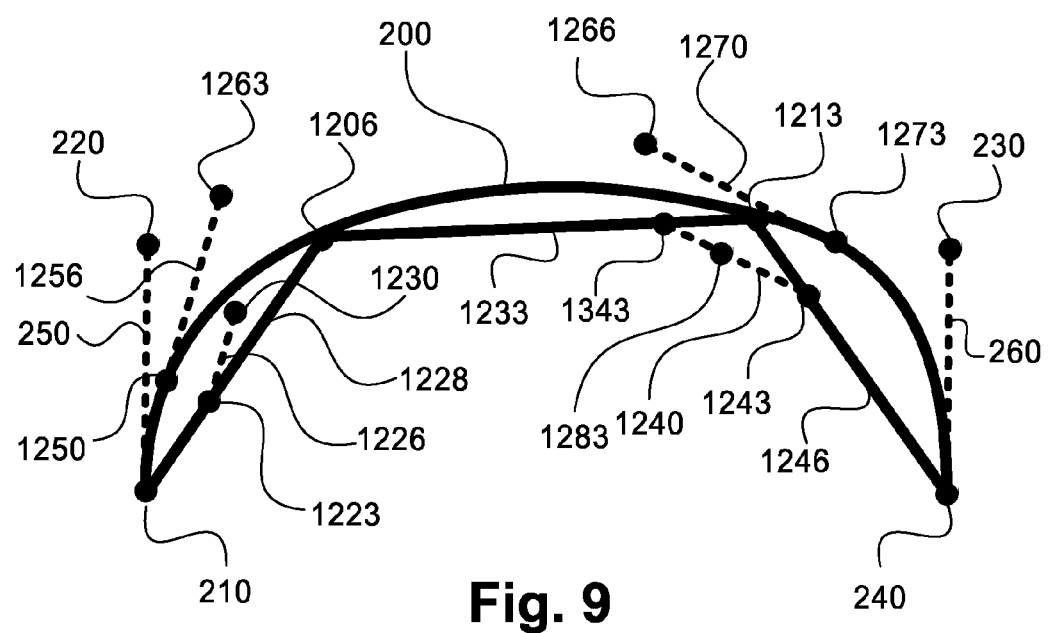
FIG. 9 is an alternative example of the interim steps used to generate a vectorised sub-curve generated by the sub-curve vectorisation arrangement of FIG. 5.

An example of this implementation is now provided with reference to FIG. 5, FIG. 8 and FIG. 9.

In step 675, it is determined that the vector formed by shift point 1283 and intermediate point 1213 turns to the right relative to the vector formed by reference point 1243 and shift point 1283 while the original turn direction of the vector formed by intermediate points 1213 and 1206 relative to the vector formed by reference point 1243 and intermediate point 1213 is to the left.

The line 1240 is extended to intersect with line 1233 where the intersection point is determined to be a new shift point 1343 seen in FIG. 9. The dash is re-vectorised to remove the original dash end shift point 1240 and the intermediate point 1213, replacing those points with the new shift point 1343. The resulting re-vectorised dash comprises the stored reference point 1223 and shift point 1230 for the start of the dash combined with intermediate point 1206, the modified end of dash shift point 1343 and end of dash reference point 1243 to form the complete centreline of the vectorised dash.

Implementation 4

In another implementation, additional processing is performed in dash re-vectorisation step 675 to avoid a further case where a potential undesirable inflection can occur. The extra processing involves potential deletion of an intermediate point.

In addition to the situation described in Implementation 2, it is also possible for cases to arise where the shift point "overshoots" the vectorised sub-curve representing the dash. This situation cannot generally be resolved by the method of Implementation 2, because the preferred distance of the shift point from the reference point is the minimum distance which preserves an accurate angle or slope of the vector between those points and the tangent to which the vector is parallel. Moving the shift point to the intersection of the reference point to shift point line and the line between intermediate points would reduce the distance from the shift point to the reference point, and would therefore be at risk of causing an inaccurate angle due to a dramatic change in direction of the curve.

If the length of the line formed by the reference point and shift point is greater than or equal to the length of the line formed by the reference point and a first intermediate point, then step 675 additionally deletes or marks for deletion the first intermediate point from the re-vectorised dash, to avoid the undesirable inflection in the vectorised curve.

Example 4

An example of Implementation 4 can be seen in FIG. 11, in which the shift point 1560 related to reference point 1540 overshoots the first intermediate point 1510, introducing an inflection point.

Step 675, when processing the end of dash endpoint 1580, determines the length of the line formed by reference point 1540 and shift point 1560 to be 16 units and the length of the line formed by reference point 1540 and intermediate point 1510 to be 15 units. Since the length of the line formed with the shift point is greater than the length of the line formed with the first intermediate point, the dash is re-vectorised to remove the intermediate point 1510.

The length of the line formed by reference point 1580 and shift point 1570 is determined to be 16 units and the length of the line formed by reference point 1580 and intermediate point 1520 is determined to be 20 units. Since the length of the line formed with the shift point is less than the length of the line formed with the first intermediate point, the intermediate point is retained in the re-vectorised dash.

The final re-vectorised dash comprises stored reference point 1540 and shift point 1560 for the start of the dash, intermediate point 1520, and shift point 1570 and reference point 1580 for the end of the dash.

INDUSTRIAL APPLICABILITY

The arrangements described are applicable to the computer and data processing industries and particularly for the display and printing of curves represented using dashes and particularly those curves that are stroked.

The foregoing describes only some embodiments of the present invention, and modifications and/or changes can be made thereto without departing from the scope and spirit of the invention, the embodiments being illustrative and not restrictive.

We claim:

1. A computer-implemented method of processing a curve intended to be dashed and stroked, the method comprising:
    obtaining a first vectorization of the curve according to a predetermined flatness tolerance to establish at least one initial linear segment between corresponding vectorization points;
    identifying an endpoint of a dash on one said initial linear segment as a reference point;
    establishing a tangent to the curve at a first point on the curve associated with the reference point;
    determining, in accordance with the pre-determined vectorization flatness tolerance, by a processor, a shift point on a line running through the reference point, said line being parallel to the tangent to the curve at the first point and the shift point being within the dash; and
    determining a dashed vectorization of the curve having at least one path, each said path being formed from a plurality of further linear segments, the further linear segments comprising at least a first further segment joining the reference point and the shift point, and a second further segment joining the shift point and a further point determined using at least a length of the dash.

2. A method according to claim 1, further comprising moving a position of the endpoint to a modified position to maintain an endpoint of the dash on the curve.

3. A method according to claim 1, further comprising moving a position of the shift point to a modified position located on the curve.

4. A method according to claim 3, further comprising moving the reference point to a new position to ensure a distance between the new position and the modified position is less than the flatness tolerance to ensure all segments of the further vectorization are within the flatness tolerance.

5. A method according to claim 1, wherein the first point is associated with the reference point by a line perpendicular to the tangent passing through the reference point.

6. A method according to claim 1, wherein a location of the further point is dependent on the first vectorization.

7. A method according to claim 6, wherein a vectorization point of the first vectorization is selected as the further point based on distance between the shift point and a vectorization point.

8. A method according to claim 1, further comprising removing at least one intermediate vectorization point from the first vectorization.

9. A method according to claim 8, wherein the removal of the at least one intermediate vectorization point is based on a curvature of the curve in the vicinity of the intermediate vectorization point.

10. A method according to claim 8, wherein the removal of the intermediate vectorization point is based on a position of at least one of the shift point and the reference point.

11. A method according to claim 1, wherein the position of the shift point along the line parallel to the tangent is determined in accordance with at least one of:
    (i) the flatness tolerance;
    (ii) the curvature of the curve; and
    (iii) the position of the reference point relative to a closest intermediate vectorization point from the first vectorization.

12. A method according to claim 11, wherein the curvature is determined based on slope of the curve tangents in the vicinity of the shift point.

13. A method according to claim 12, wherein the curvature is determined as that of an arc of the curve between the endpoint and the intermediate vectorization point.

14. A method according to claim 13, wherein the curvature is based on a circle fitted to the arc.

15. A method of vectorizing a curve, the method being performed by a processor and comprising:
    determining a reference point distanced from the curve and a first point on the curve associated with the reference point;
    determining a line running through the reference point from a tangent to the curve at the first point, said line and tangent being parallel;
    determining, by the processor, a shift point on the determined line; and
    vectorizing the curve by a path formed from a plurality of linear segments, the plurality of segments comprising at least a segment joining the reference point and the shift point.

16. A computer-implemented method for rendering a curve, the curve having a control point, the method comprising:
    receiving a set of intermediate points characterizing a vectorised curve corresponding to a vectorized representation of the curve with a pre-determined flatness tolerance;
    receiving a reference point associated with the vectorized curve, the reference point being distanced from the curve, a position of the reference point being determined based on a pre-determined dash pattern;

determining a line running through the reference point being parallel to a tangent to the curve at a first point, wherein the first point being associated with the reference point;

determining a shift point on the determined line; and rendering the curve by using vectorised segments, wherein vectorised segments are formed by vectorizing the curve using the received set of intermediate points by a path formed from a plurality of linear segments, the plurality of segments comprising at least a segment joining the reference point and the shift point.

17. A method according to claim 16, wherein a position of the shift point is determined in accordance with the pre-determined flatness tolerance, the dash pattern, a relative position of at least one point from the received set of intermediate points and a curvature of the curve.

18. A method according to claim 16, wherein the plurality of segments comprises a segment joining the shift point and an intermediate point from the set of intermediate points.

19. A method according to claim 16, wherein the tangent to the part of the curve at the endpoint is determined based on control points of the curve and a position of the endpoint along the curve.

20. A method according to claim 16, wherein the rendering further comprises:

stroking the vectorized segments at a pre-determined stroke width; and at least one of storing the rendered curve to a memory device, and reproducing the rendered curve on a reproduction device.

21. A non-transitory computer readable storage medium having a program recorded thereon, the program being executable by a computer apparatus to vectorizing a curve, the program comprising:

code for determining a reference point distanced from the curve and a first point on the curve associated with the reference point;

code for determining a line running through the reference point from a tangent to the curve at the first point, said line and tangent being parallel;

code for determining a shift point on the determined line;

code for vectorizing the curve by a path formed from a plurality of linear segments, the plurality of segments comprising at least a segment joining the reference point and the shift point; and code for at least storing the vectorized curve to a non-transitory storage medium.

22. A computer apparatus comprising a processor and a memory, the memory storing a program for execution by the processor to process a curve, the program comprising:

code for determining a reference point distanced from the curve and a first point on the curve associated with the reference point;

code for determining a line running through the reference point from a tangent to the curve at the first point, said line and tangent being parallel;

code for determining a shift point on the determined line;

code for vectorizing the curve by a path formed from a plurality of linear segments, the plurality of segments comprising at least a segment joining the reference point and the shift point; and code for at least one of storing the vectorized curve to a non-transitory storage medium, and reproducing the rendered curve on a reproduction device.

* * * * *